Figure 1:
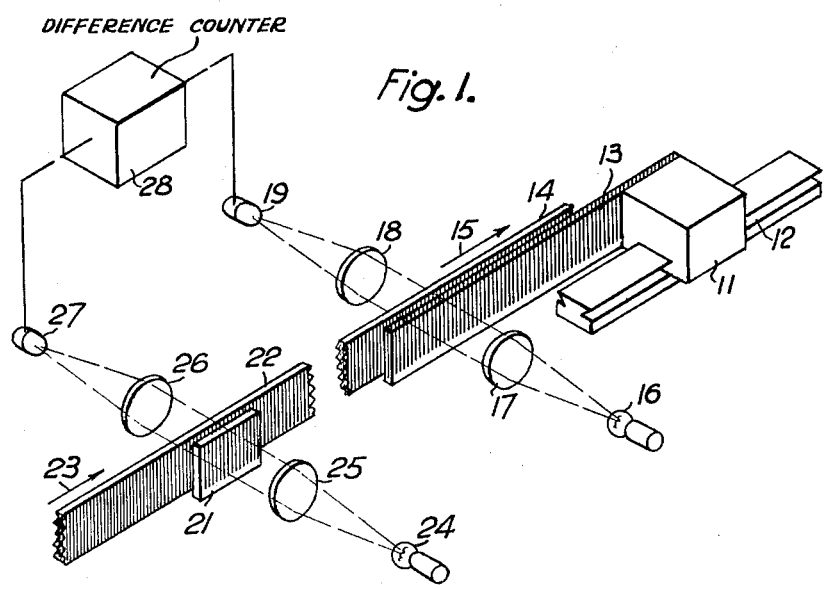

INVENTORS
DEREK LESLIE ARTHUR BARBER
MAURICE PEARSON ATKINSON

BY Larson and Taylor

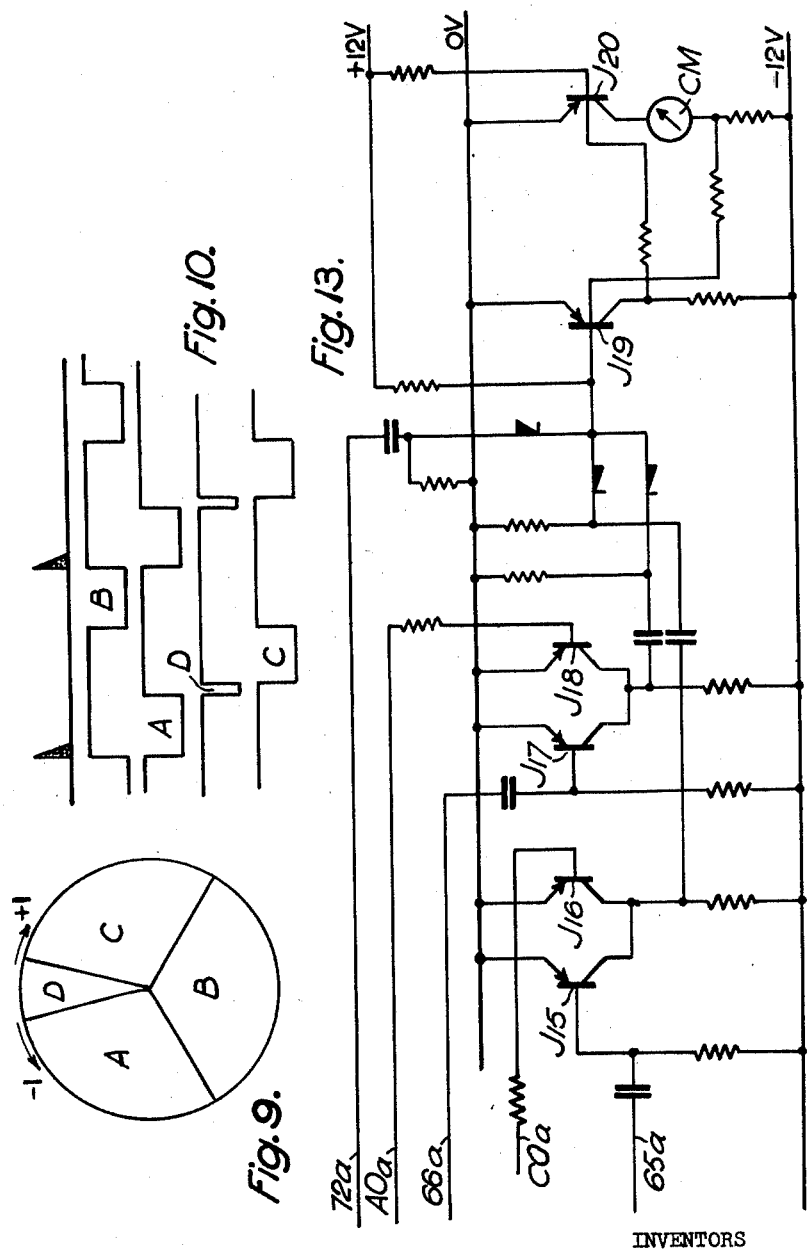

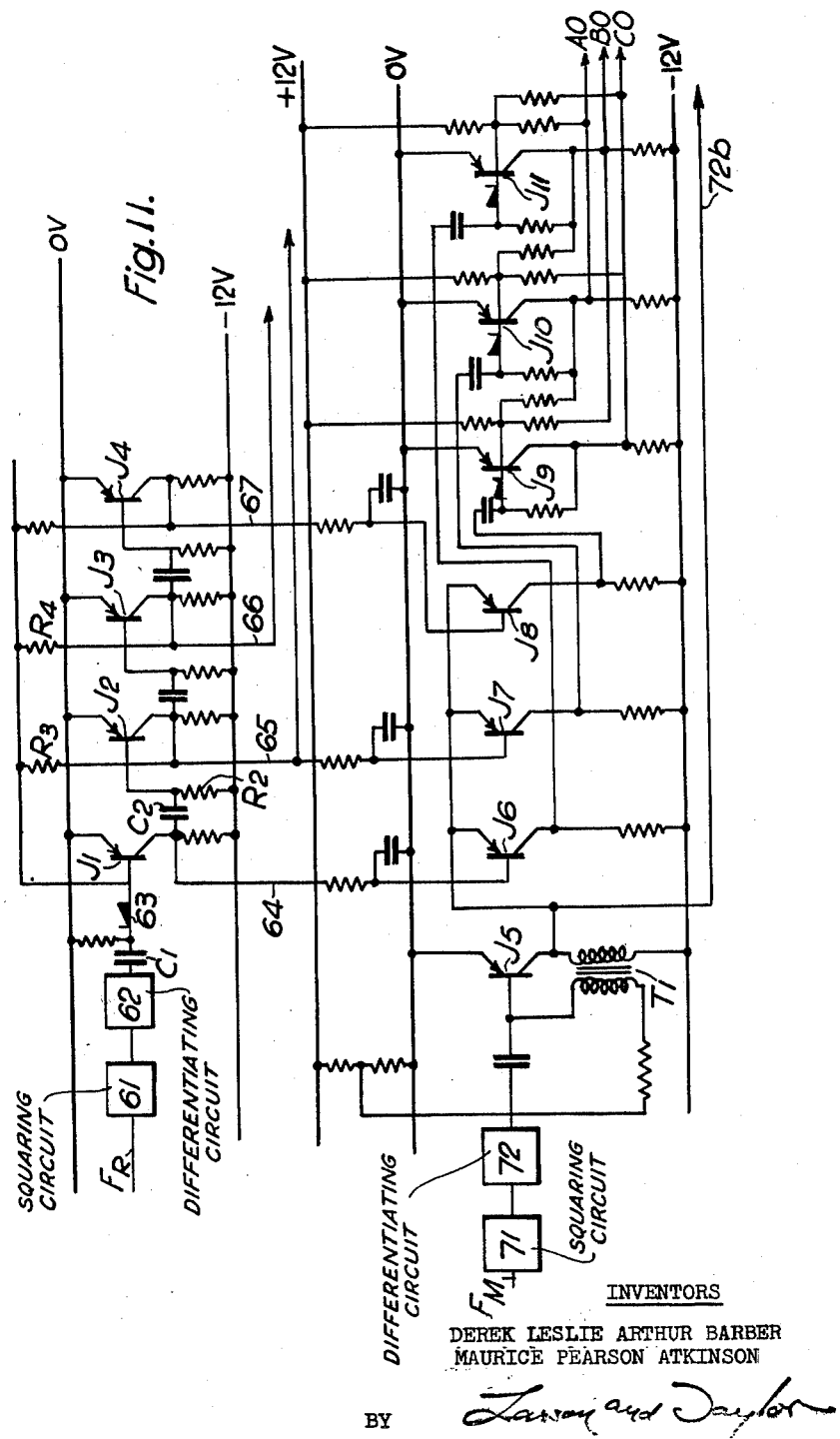

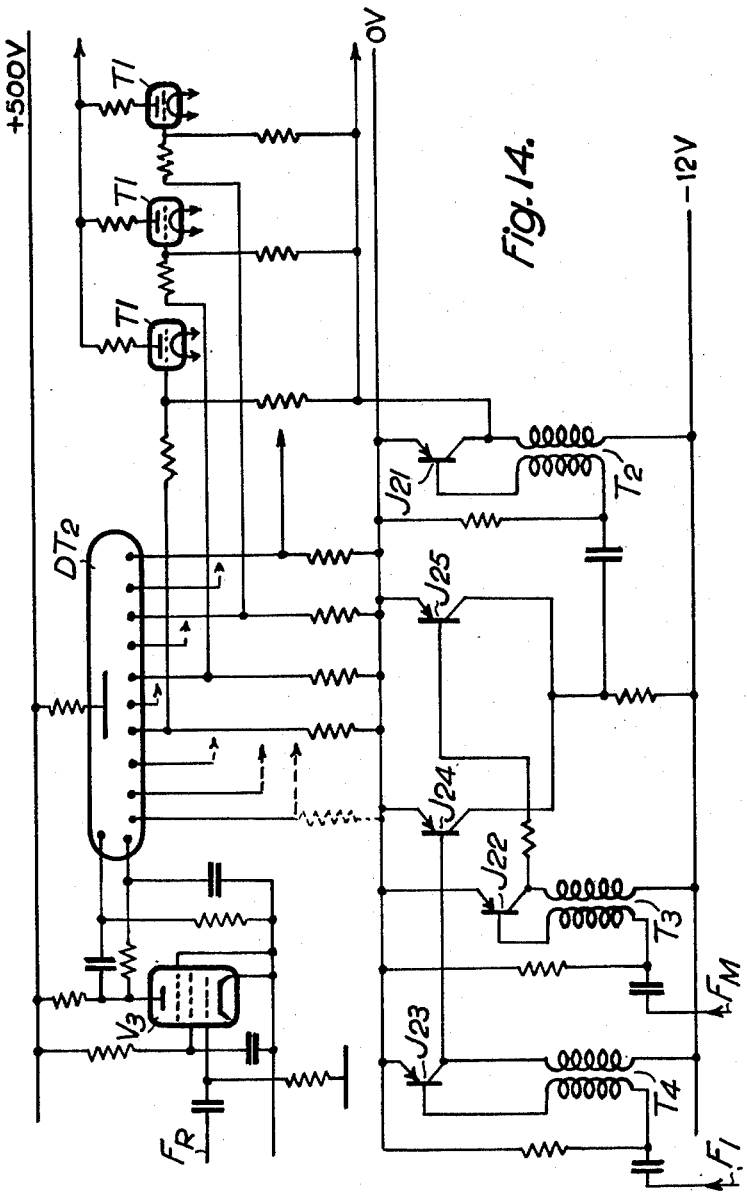

3,153,111
MEASUREMENT OF DISPLACEMENTS
Derek Leslie Arthur Barber, Shepperton, and Maurice Pearson Atkinson, Sunbury, England, assignors to National Research Development Corporation, London, England, a British corporation
Filed June 26, 1959, Ser. No. 823,150
Claims priority, application Great Britain June 26, 1958
15 Claims. (Cl. 88—14)

This invention relates to the measurement of the displacement of a moving part such as a machine part by the aid of optical gratings which are moved relative to one another by the displacement to be measured.

Arrangements of this kind are known which depend on counting the passage over one or more photoelectric cells of moiré fringes produced between the two relatively moving gratings. The known scheme requires one grating to extend over the full interval to be measured but the other can be and usually is comparatively short. While this method is capable of measuring to a very high degree of accuracy it necessitates very accurate alignment of the optical components and also relatively complex electronic equipment particularly if interpolation between fringes is desired. The optical elements must be associated with the short grating which means either that they move with resulting difficulties in focussing, or that the long grating must move with resulting mechanical and spatial difficulties. For convenience the stationary grating may be referred to as the reference grating and the moving grating as the measurement grating.

According to the present invention an A.C. signal is derived from the measurement grating by the aid of another grating in constant movement, this movement having a determined relationship to a second A.C. signal serving as a reference signal, and the desired information is evaluated from the relationship of the two A.C. signals. The information may be in the form of a signal by which a servo can be controlled to effect a correction or adjustment in the displacement of the moving part.

In most cases the second A.C. signal will itself be derived by the aid of a second comparison grating in constant movement in relation to a reference grating, the movement of this second comparison grating having a determined relationship to the movement of the first mentioned comparison grating. It would be possible to use two wholly separate comparison gratings but since the correlation of their motions clearly must be effected with an accuracy of a higher order than that of the measurement being effected it is preferred to select the parameters of the apparatus so that their motions are identical thus enabling them to be attached to a common moving member, and as will be shown and as is still more preferable, they may be reduced to a single grating.

A further development of the invention uses an image of the comparison grating or gratings. This not only has the advantage of enabling the parts to be physically disposed with greater convenience but the more important advantage that what is truly a single comparison grating may be used i.e. images derived from the same part of the comparison grating so that a comparison grating may be used the lines of which are no longer than those of the measurement grating or reference grating which physical conditions might otherwise make necessary and which substantially increases the risk of errors because it is difficult to provide a grating with long lines which is accurate over the full length of the lines within the limits herein view and even if such a grating is provided it is still difficult to align it accurately. Both functions of the comparison grating may be effected by the use of images and it is possible to derive them both from the one grating by the use of a beam splitter. Images of one or both may also be used in cases where there are two distinct comparison gratings.

Two types of motion of the comparison gratings are possible. One is a steady movement in one direction (whether linear or rotary) and the other is a vibratory movement. Further there may be actual physical movement, or the optical effect of such movement may be used as will be explained further below.

Figure 2:
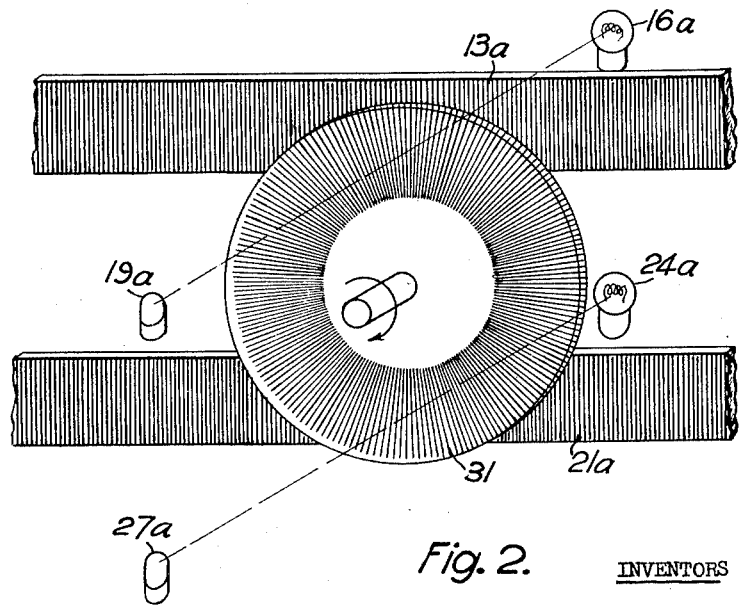
Figures 3, 4:
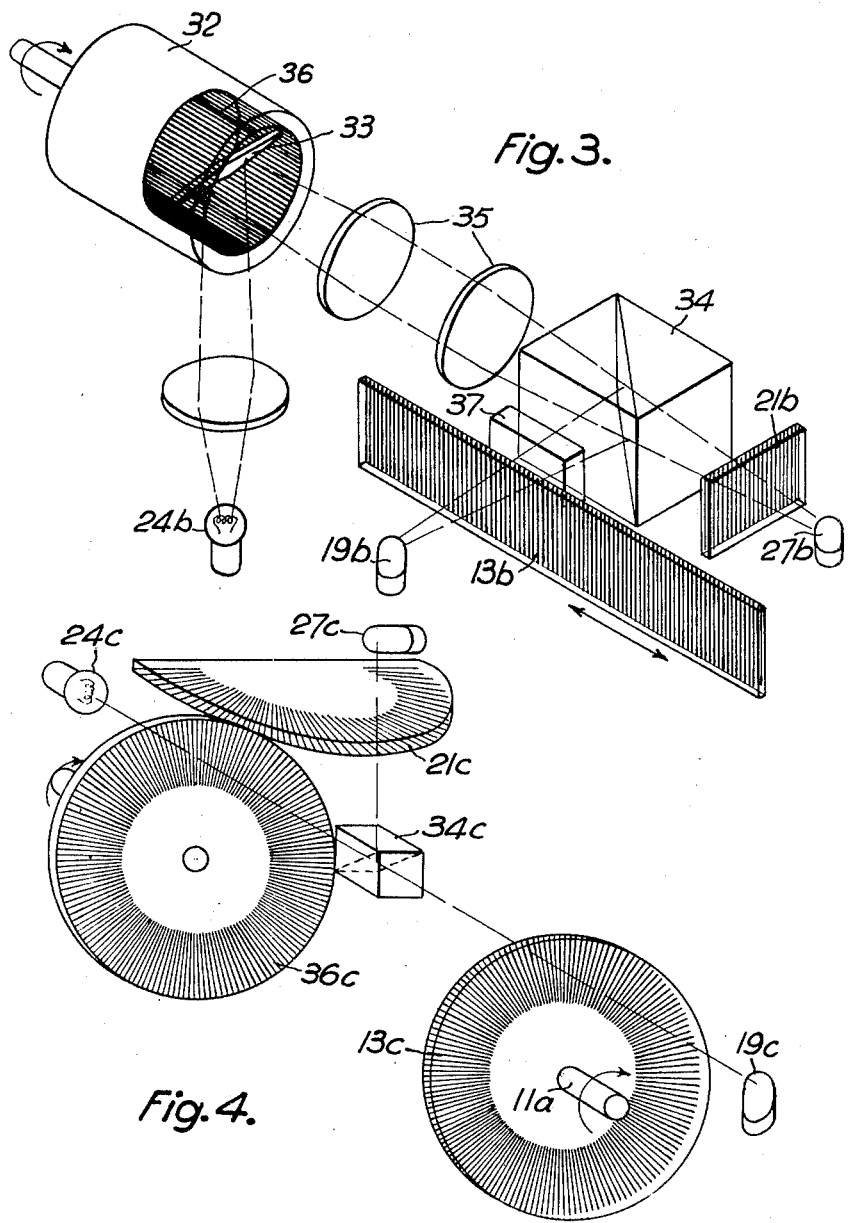
Figure 5:
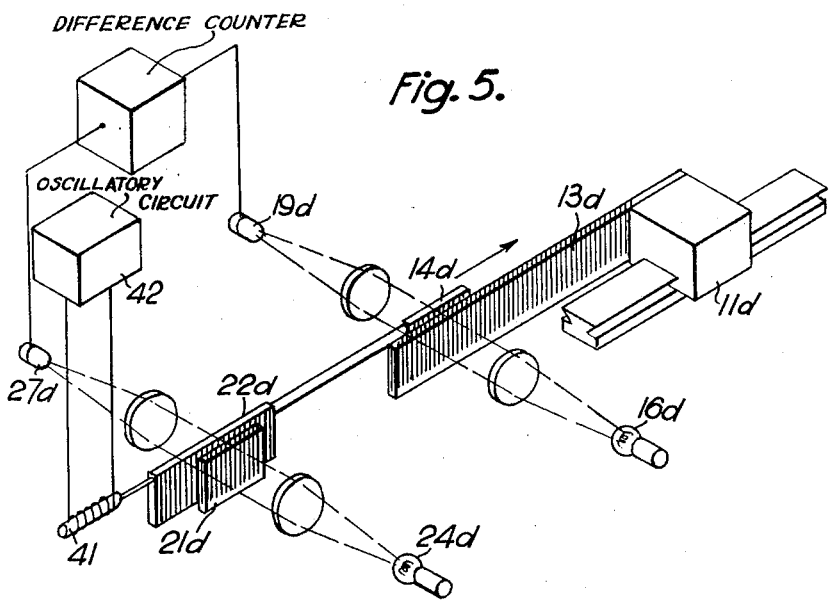
Figure 6:
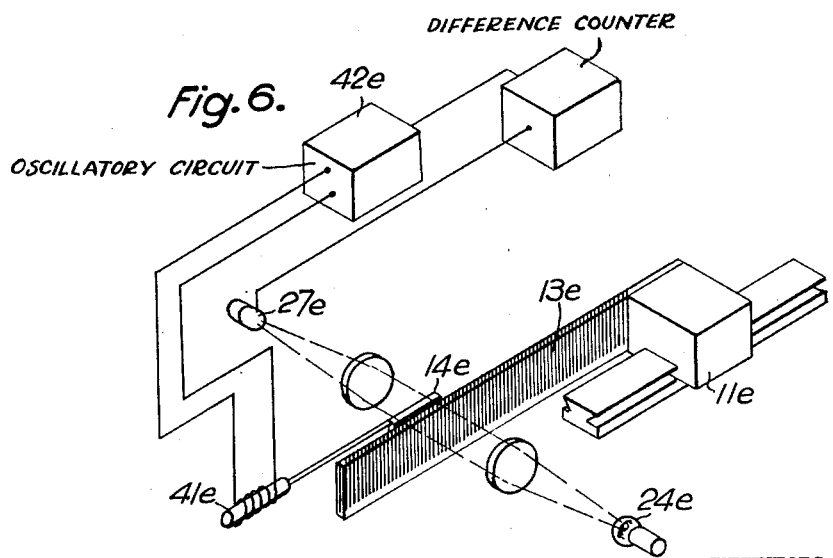
Figure 7:
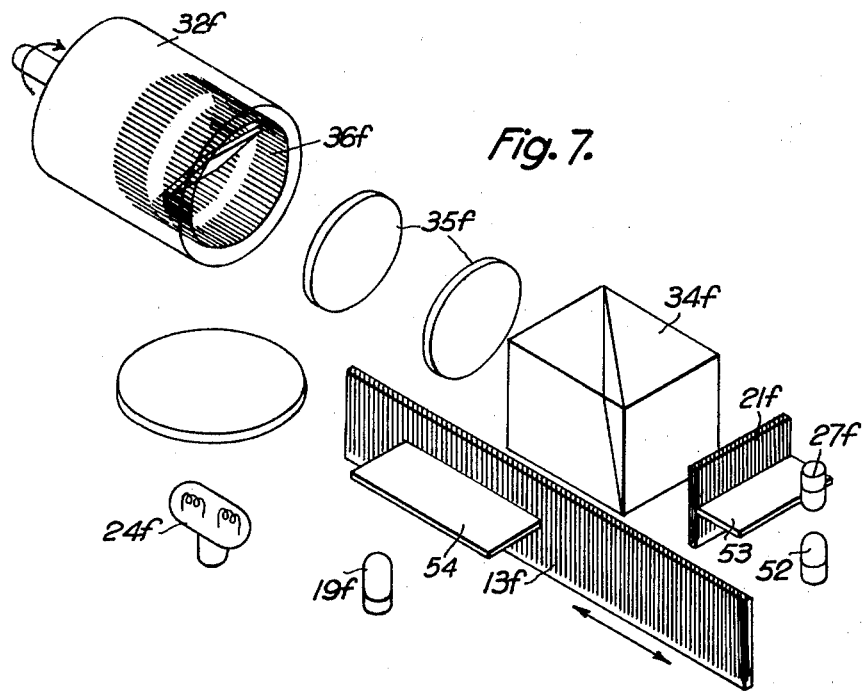
Figure 8:
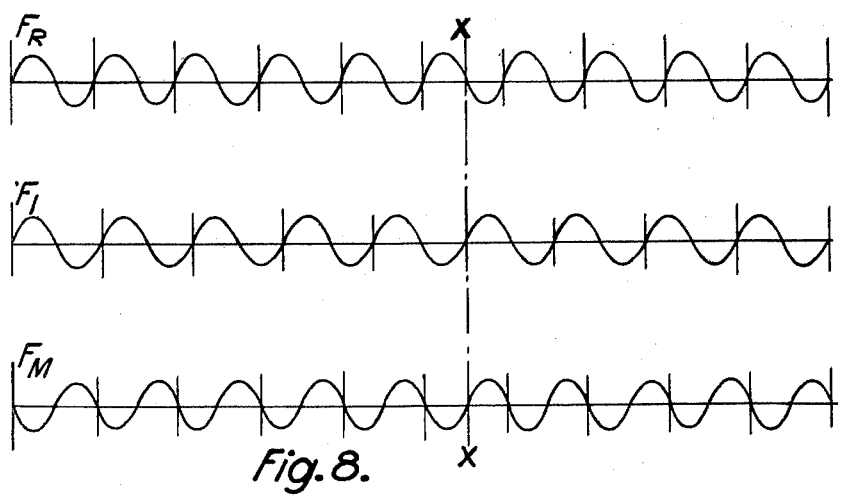
Figure 12:
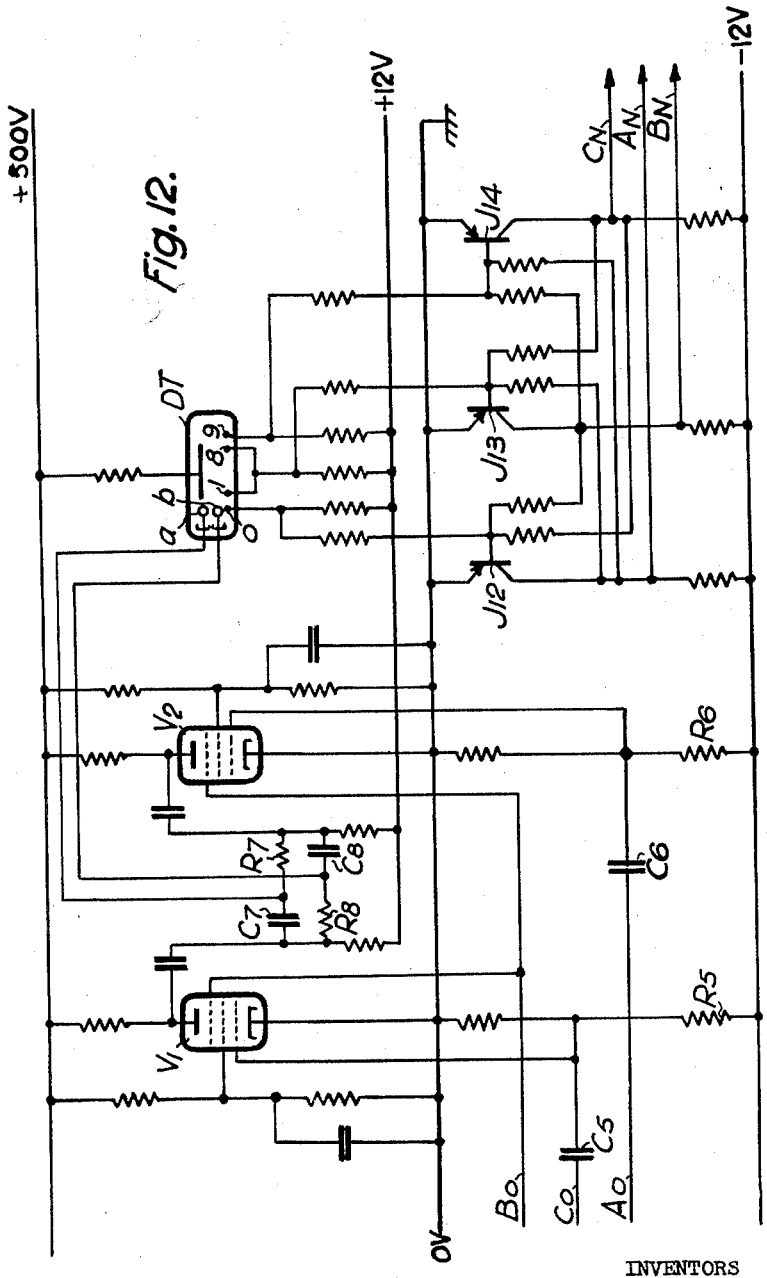

The invention will be further described with reference to the accompanying diagrammatic drawings in which, FIGURE 1 is a perspective view by reference to which the underlying principles of the invention will be explained, FIGURE 2 is a perspective view showing a comparison grating of disc form, FIGURE 3 shows the use of comparison gratings of image form derived from a drum, FIGURE 4 illustrates the application of the invention to rotary motions, FIGURES 5 and 6 show the use of a vibrating comparison grating, FIGURE 7 is a similar view to FIGURE 3 but incorporating a further grating, hereinafter termed an interpolation grating, FIGURE 8 illustrates the signals obtained with the scheme of FIGURE 7, FIGURE 9 is a diagram illustrating a mode of dividing one of the two A.C. signals into zones, FIGURE 10 is a diagram corresponding to FIGURE 9 showing the zones represented by separate signals, FIGURE 11 illustrates one convenient practical circuit for effecting continuous counting of the integral part of the difference from datum in the number of cycles of the two signals to be compared, FIGURE 12 illustrates one convenient circuit of one decade of a counting circuit using a dekatron tube, FIGURE 13 illustrates one convenient circuit for interpolation between cycles of the count without the use of the interpolation grating, and FIGURE 14 illustrates one convenient circuit for digital interpolation using an interpolation grating.

FIGURE 1 illustrates the case of linear motion exemplified by a carriage 11 moving on a slideway 12. To the carriage in secured an optical measurement grating 13 extending in the direction of motion and sharing in the motion of the carriage. A first comparison grating 14 of the same line spacing as the grating 13 moves continuously at a predetermined speed close to the grating 13 in the direction of the arrow 15. Since it is generally necessary to keep this grating in movement for comparatively long periods the portion shown in the drawings may be regarded as part of a flexible loop though as will be understood it is in practice simpler to use gratings formed on discs or drums. Light from a source 16 (lamp, slit and other optical elements deemed necessary) is collimated as by a lens 17 and the beam is directed through the two gratings 13, 14 then being concentrated as by a lens 18 on to a photoelectric cell 19. As long as the two gratings 13, 14 are in relative motion the beam will be modulated and an A.C. voltage will be produced by the cell 19 the frequency of which is a function of the line spacing and relative speed of the two gratings. Desirably the character of the gratings and of the photoelectric cell are chosen so that as long as the relative motion is at constant speed the wave form of the signal is sinusoidal though this is not essential.

The apparatus further includes a fixed reference grating 21 closely past which a second comparison grating 22 moves in the direction of the arrow 23 at a predetermined speed. An A.C. signal is derived from this motion by the aid of a light source 24, collimator 25, concentrator 26 and photoelectric cell 27. This signal is desirably sinusoidal and is of constant frequency constituting a reference signal.

The line spacings of the gratings and the speeds at which the gratings 14, 22 move are so chosen that when the carriage 11 is stationary the frequency of the two signals is the same. However the two signals will have a phase difference (using the term "phase difference" in a wide sense to include the number of complete periods from a datum time and not only the final fraction of a period) dependent upon the relative position of the measurement and reference gratings. Thus the measurement only of the relative phase of two signals of the same frequency determines the static position of the measurement grating and therefore of the carriage 11. If the carriage 11 is in motion the frequency of the signal from the cell 19 decreases or increases according to whether the carriage moves in the same or the opposite direction to the grating 13. Consideration will show that the difference in the number of cycles derived from the cell 27 and the number derived from the cell 19 will represent the distance the carriage 11 has moved from datum position irrespective of the speed of movement of the carriage. Thus by feeding the signals to a counter indicated at 28 which counts the difference the position of the carriage from datum position can be determined.

How this counting may be effected will be described below but it may here be mentioned that since the two signals are A.C. signals and only the counting of cycles is here in question, drift in amplifiers and photo cells and such like variations do not affect the measurement thus simplifying the circuitry. Further, accurate optical alignment of the measurement grating 13 in relation to the reference grating 21 is not necessary. As so far described the system is digital, the position of the carriage being indicated to a limit represented by one line spacing of the grating 13. For practical reasons it is desirable that this line spacing should not be too fine and the invention can be developed as will be described to interpolate between the lines.

Since the same frequency is required from both pairs of gratings when the carriage is stationary it is simplest to make the line spacing of all four gratings the same and to move the gratings 14, 22 at the same speed. These gratings 14, 22 could therefore be parts of one and the same endless loop. Endless loop gratings are however not very convenient because they are difficult to make and it is difficult to avoid variations in elastic strain which varies the line spacing.

Since the reference grating 21 can in general be placed where convenient it becomes possible to replace the linear gratings 14, 22 by a disc having a grating on it in the form of radial lines as indicated in FIGURE 2 at 31. The measurement grating is indicated at 13a and the reference grating at 21a while the corresponding light source and photoelectric cells are shown at 16a, 24a, 19a and 27a. Other optical elements and the counting circuit have been omitted. As shown the gratings 13a and 21a are parallel but this is not essential, as the grating 21a can be shifted anywhere around the axis of the disc 31 where it would not interfere with the cooperation of the disc and the grating 13a. The disc 31 constitutes the comparison grating and is rotated at a constant predetermined speed. Since the disc 31 has a rotary movement while the grating 13a has a linear movement the beam by the aid of which the signals from the cell 19a are derived must be a narrow one and the wave form will be somewhat complex but so long as simple digital counting of signals is sufficient this will not occasion any real difficulty and the same applies even if phase measurements are required for determining intermediate positions of the carriage.

To avoid this the comparison grating may as shown in FIGURE 3 be provided at 36 on a drum 32 with the lines parallel to the axis of rotation. Direct juxtaposition of a drum to a measurement grating and a reference grating can be obtained but if as may often be the case the reference and measurement gratings have to be set parallel with one another this means that they must be spaced axially in relation to the drum which means in turn that the lines on the grating in the drum must be very long, in other words, in effect, there are two comparison gratings. It is very difficult to make such a grating with long lines of adequate accuracy and it is also essential that the drum should be correctly aligned and centred otherwise the phase relationship of the two trains of signals may vary as the drum rotates. A narrow drum could be used and the reference grating lie in a different plane from the measurement grating but spatial conditions may make this difficult or impossible. The development of the invention illustrated in FIGURE 3 overcomes all these difficulties and gives ample flexibility in positioning the parts by using images of a single comparison grating, the images which being cooperate with the measurement and reference gratings being derived from the identical portion of the comparison grating on the drum. As will be seen in FIGURE 3 light from a source 24b is directed through the grating 36 on the periphery of the drum 32 and is thence reflected in an axial direction by a fixed reflector 33. The reflected beam is directed into a beam splitter cube 34 of well known construction. The one part beam continues through the reference grating 21b and the reflected part continues through the measurement grating 13b. The two modulated part beams thus produced fall on to respective photo cells 27b, 19b the necessary concentration being produced by lenses diagrammatically indicated at 35. In this case the reference grating 21b has its plane at right angles to that of the measurement grating 13b but by the addition of auxiliary reflectors any desired relative position of the two gratings can be obtained. As before additional optical elements such as slits and collimating lenses may be provided as necessary. A transparent slab 37 which can be rocked on a vertical axis will enable zero corrections to be effected by slightly displacing the reflected beam longitudinally with respect to the grating 13b.

An interpolation grating is described below and if this is used with the scheme of FIGURE 3 it may be arranged concentrically witht he comparison grating 36 and a light source and screen analogous to those described below will also be used.

An advantage of the arrangement shown in FIGURE 3 is that the images of the comparison gratings are of the same form as the gratings 13b, 21b with which they cooperate and a wider aperture can be used than in the arrangement shown in FIGURE 2.

FIGURES 1 to 3 relate to a linear motion but the invention is equally applicable to rotary motions. One convenient layout employing gratings in disc form is illustrated in FIGURE 4. Here the moving member is exemplified by a shaft 11a which carries a radial measurement grating 13c of disc form. A comparison grating 36c of disc form rotates constantly at a predetermined speed and a reference grating 21c also of radial form is provided in fixed position. Light from a light source 24c passes through the grating 36c and enters a beam splitting cube 34c. One beam passes through the reference grating 21c to fall on to a photo cell 27c while the other beam passes through the measurement grating 13c to fall on a photo cell 19c. As shown the direct beam falls on the photo cell 19c and the reflected beam on the photo cell 27c but the opposite arrangement is possible if for instance it is found preferable owing to local conditions to arrange the axis of the disc 36c perpendicular to that of the shaft 11a. It will also be clear that the gratings 36c, 13c could be of drum form and the reference grating of linear form if that were more convenient in any particular case.

An interpolation grating, light source and screen analogous to those described below can also be used here.

The arrangements above described with reference to FIGURES 1 to 4 all involve continuous movement in one direction of the comparison grating or gratings. Instead of the motion always being in one direction, a vibratory motion may be employed.

FIGURE 5 shows a scheme analogous to that of FIGURE 1. A measurement grating 13d is attached to a carriage 11d and a reference grating 21d is provided in a fixed position. Respective comparison gratings 14d, 22d cooperate with these. They can be relatively short and they are secured rigidly together so that their movements are rigidly correlated. The vibratory movement is here imparted by the aid of a magnetostrictive transducer 41 linked to the comparison gratings and driven by any suitable oscillatory circuit indicated at 42. As in FIGURE 1 there is a light source 16d and photoelectric cell 19d associated with the measurement grating and the one comparison grating and another light source 24d and photoelectric cell 27d associated with the reference grating and the other comparison grating. The vibration of the comparison gratings produces A.C. signals in a similar manner to those obtained in FIGURE 1 and the position of the measurement grating could therefore be evaluated.

If no more than exact positioning of the measurement grating at a selected point is required instead of providing a counting circuit the signal from the two photoelectric cells can be supplied to a phase sensitive detector. The measurement grating is brought to within one line spacing of the required position and its precise position then becomes a function of the difference in phase between the two signals and the phase sensitive detector enables its position to be adjusted until the signal coresponds to the desired position.

If no more than precise positioning in this way is required the reference grating 21d and the comparison grating 22d may be omitted since their sole function is to produce a reference alternating current signal and this signal can instead be directly derived from the oscillator which excites the transducer. This scheme is shown in FIGURE 6 where the measurement grating is marked 13e and the vibrating comparison grating 14e while the transducer is marked 41e, and the oscillator by which it is driven 42e. A possible disadvantage of this system compared with that of FIGURE 5 is that the mean position of the vibrating grating 14e or the relative phase between its position and that of the driving signal from the oscillator may vary. Any variation will cause the signal given by the phase sensitive detector to vary without the position of the measurement grating changing.

Other devices than a transducer may be used for vibrating the gratings in FIGURES 5 and 6. For example an electrically excited tuning fork might be used. Another possibility instead of vibrating the gratings 14d and 22d or 14e is to vibrate an associated optical element e.g. the lamp, the photo cell or preferably some intervening element such as a lens or mirror. Yet another possibility is to use a two phase light source or two phase photo cell as described in Wilde's application Serial No. 23,701, filed April 21, 1960. It is here convenient to mention instead of using a moving grating in the schemes of FIGURES 1 to 4 the effect of a grating moving continuously in one direction may be obtained by the use of a polyphase light source or polyphase photoelectric cell also as described in the aforesaid application Serial No. 23,701.

With the schemes so far described counting of cycles will give the position of the measurement grating within the limits of one line spacing. Counting is a relatively simple operation and is purely digital in nature. If as is usually the case the position of the measurement grating to much smaller limits needs to be known digital counting can still be employed to determine the position up to the nearest line spacing and the position within the line spacing can then be obtained by measuring the phase difference between the two signals i.e. the final fraction of a period. A further development of the invention enables a digital measurement to be substituted as mentioned above. This involves the use of a further grating which is conveniently termed an interpolation grating and its provision in a scheme otherwise on the lines of FIGURE 3 is shown in FIGURE 7. The parts which correspond with those shown in FIGURE 3 have been given corresponding references with the suffix f. In addition there is an interpolation grating 51 conveniently marked on the same drum 32f as that carrying the comparison grating 36f. Also the reference grating 21f will be twice as wide as previously and an extra photoelectric cell 52 is provided responsive to the combined effect of the image of the interpolation grating 51 and the reference grating 21f. A screen 53 is provided between the photoelectric cell 52 and 27f to ensure that the cells only respond to the correct modulation. Two images will also fall on the measurement grating 13f but the grating may be narrow so that it only responds to the comparison image or a screen 54 may be provided to separate the two images. The light source 24f is here shown as a twin filament lamp to cover the two gratings 36f, 51 but in practice only a single collimating lens is needed. The optical elements following the gratings 36f, 51 are arranged so that separate images are thrown on to the reference and measurement grating.

It is not essential that the grating 51 should be on the same drum as the grating 36f but this has the advantages above mentioned of avoiding relative error. The grating 51 has a line spacing different from that of the grating 36f and it may be likened to a vernier. The effect of its use is best described by reference to a diagram shown in FIGURE 8. This is drawn on the assumption that the effective pitch of the interpolation grating 51 is 0.9 times that of the comparison grating 36f. The uppermost wave represents a signal produced by the coaction of the comparison and reference gratings i.e. the reference frequency $F_R$. The second line indicates a signal $F_I$ produced by the coaction of the interpolation and reference gratings, and in view of the relative pitch of the interpolation and comparison gratings during 10 cycles of the signal $F_R$ there will be 9 cycles of the interpolation signal $F_I$. The third line indicates the signal $F_M$ produced between the measurement grating and comparison grating when the measurement grating is stationary. Under these conditions the frequency of signal $F_M$ is the same as that of signal $F_R$ but the phase relationship will depend on the position of the measurement grating. So far as any whole number of line spacings is concerned the relative phase between signals $F_R$ and $F_M$ will not show on the diagram but is taken care of by the digital counter which counts whole periods. The relative phase will only appear in the diagram as regards the final fraction of a period. During any interval of ten cycles of signal $F_R$ particular points of corresponding phase of signals $F_M$ and $F_I$ coincide only once, in the case shown at the point indicated by the line X—X.

By applying the signal $F_R$ to a decimal counter controlled so that its state can only be observed (or recorded) when the particular points of signals $F_I$ and $F_M$ coincide the number appearing on the counter will indicate the position of the measurement grating relative to the position where signals $F_M$, $F_I$ and $F_R$ are all in phase, in tenths of the distance corresponding to the pitch of the comparison grating. Obviously units other than tenths may be used by choice of the relationship between the comparison and interpolation gratings together with an appropriate counter.

It will be clear that the provision of an interpolation grating is not limited to the case in which the comparison grating is on a drum. It can equally well be used with any of the other schemes above described including the case in which the comparison grating vibrates and including cases in which the effect of vibration or continuous movement is obtained without physical vibration or steady movement of the grating itself is being employed.

There remains now the means of which the various counting operations referred to above are performed.

Considering first the counting of the complete fringes that is the number of complete cycles or periods from datum, the two sets of cycles i.e. the measurement signal and the comparison signal can be separately counted and one figure be subtracted from the other but the equipment can be simplified by continuously comparing the two signals and counting only the difference in the total number of periods or cycles.

One signal, conveniently the reference signal, is split up so that each cycle is similarly divided into a plurality of time intervals, so that the first interval of each cycle constitutes one sequence, the second interval of each cycle constitutes a second sequence and so on.

In general (apart from provision for eliminating the effects of vibration which will be described) the intervals into which the cycle is divided may be equal though this is not essential. For convenience the sequences will be termed "zones" hereafter and in the claims. The other signal is used to form a sampling pulse. As the relative phase between the two signals changes the sampling pulse appears in each of the zones in turn, and the order of the appearance indicates the direction and number of cycles which have changed between the signals.

It may be shown that in order to indicate sign it is essential that there should be a minimum of three zones but if the signal source e.g. the moving part with which the apparatus is associated can vibrate at high frequencies it would be possible for a succession of alternate + and − signals to be applied to the counter at a rate greater than the maximum counting speed. If it is accepted that in the presence of such vibrations measurement cannot be made to an accuracy greater than that of the maximum amplitude of vibration, a "backlash" zone can be provided to separate the mark at which +1 is counted and the mark at which −1 is counted, this backlash zone being of a width just greater than the maximum amplitude of vibrations to be provided for. Thus miscounting is avoided without sacrificing the highest accuracy obtainable.

This scheme and the principles of the counting operation are illustrated in FIGURES 9 and 10. In FIGURE 9 which is a circle diagram on which time would be represented by a rotating radius, three zones A, B and C are shown together with a backlash zone D between zone C and zone A while FIGURE 10 which indicates the zones in graph form, shows in the top line trigger pulses which are obtained from the reference signal, in the second line the sequence of signals which constitutes the zone B, in the third line the sequence of signals which constitutes the zone A, in the fourth line the sequence of signals which constitutes the backlash zone D, and in the fifth line the sequence of signals which constitutes the zone C. How these sequences can be obtained will be described below.

In FIGURE 9 a clockwise transition from A to C indicates an increase of one in the count while a counter-clockwise transition from C (i.e. via zone D) to A indicates a decrease of one in the count the provision of the zone B enabling a direct change from A to C to be differentiated from a change occurring via zone B. The backlash region D between A and C is slightly greater than the period of the vibration amplitude and this avoids oscillation of the counter through one digit if the counter is subject to vibration and the measurement grating happens to be positioned at a point corresponding to the junction of zones A and C. The backlash region D is then considered to form part of either A or C according to the direction of movement. Thus when passing from C to A, D is added as part of the region C and a minus pulse is not generated until A is reached. When this happens D is then considered to form part of the A zone until C occurs again and oscillations across the D–A dividing line have no effect on the counter.

If it is required to count only complete cycles of the reference pulse, then the B region could be used as the backlash region the D zone being eliminated. If, however, the phase of the reference pulse within each cycle is also required, the extent of the backlash region determines the accuracy to which the phase can be measured, and should be made as small as possible. A maximum speed of counting, however, is possible only if the extent of B is equal to ⅓ of a cycle (due to the requirement that at least one pulse shall appear in each of the regions A, B and C). Because of this, the region D is introduced into the system and is used only as a backlash zone. It is not necessary for a pulse to appear in this region for the system to work satisfactorily.

One convenient practical circuit which can be used to effect counting on the above described principles is shown in FIGURE 11.

The reference signal $F_R$ is supplied to a squaring circuit 61 and the squared signals are fed to a differentiating circuit 62 by which the signal is converted into a series of sharp pulses one per cycle. Squaring and differentiating circuits are in themselves well known and do not therefore need to be described in detail. The pulses obtained in this way are applied through capacitor C1 and rectifier 63 to a first transistor J1 which is normally cut off while three further transistors J2, J3 and J4 are normally conducting. The reference pulses are arranged to be negative and when such a pulse arrives transistor J1 becomes conducting and its collector transition is applied to the base of transistor J2 which cuts off while transistor J1 remains conducting through resistor R3. After a delay largely determined by the combination of capacitor C2 and resistor R2 the second transistor J2 becomes conducting. This causes transistor J3 to be cut off while transistor J1 is still maintained conducting through resistor R4 and the same process continues through transistors J3 and J4 until transistor J1 is finally reset. In this way the signals shown in the second, third, fourth and fifth lines of FIGURE 8 are obtained in the lines 64, 65, 66 and 67. The duration of the A, D and C signals is controlled by the time constants of the various capacity-resistance combinations while the length of the B signals depends on the repetition rate of the reference signal pulses. In more general terms it may be said that the pulses trigger a bistable circuit by which the signals B are obtained. The output of this circuit triggers a monostable circuit by which the signals A are obtained and which on recovery triggers a second monostable circuit by which signals D are obtained and on recovery this triggers a third monostable circuit by which signals C are obtained and this on recovery resets the bistable circuit giving the signals B.

To effect the actual comparison, the measurement signal $F_M$ is supplied by a squaring circuit 71 the output from which passes into a differentiating circuit 72 whereby the measurement signal is converted into sampling pulses the intervals between which bear a constant phase relationship to the measurement signal. These sampling pulses trigger a transistor J5 which is connected in a blocking oscillator circuit incorporating a transformer T1. The three signals B, A and C from the lines 64, 65, and 67 which are negative are applied to the bases of three transistors J6, J7 and J8. The operating conditions are such that these transistors are normally non-conducting. When a pulse derived from the measurement signal $F_M$ by the action of the circuit 71, 72 is applied to the transistor J5 a positive pulse is produced in the output from one of the transistors J6, J7 or J8 depending on which of them is receiving a signal B, A or C. It will be seen that the transistors J6, J7, and J8 constitute coincidence gates which are opened when a pulse is received from the measurement signal to that particular gate which is receiving the signal B, A or C. The outputs from these three gates are supplied to a three stable-state trigger circuit conveniently set up on three further transistors J9, J10 and J11. In this circuit each stable state corresponds with two transistors conducting and the third cut off. When any input pulse is received by a conducting transistor, it is rendered non-conducting and the one previously non-conducting is made conducting, and after any change the circuit remains in the same condition until the next input pulse to one of the conducting transistors. The output lines marked B0, A0, C0 lead through differentiating circuits by which pulses are derived, followed by coincidence gates, to any convenient two-way counter. A dekatron counter is suitable and such a circuit with the pulse forming circuits and other elements enabling it to be used in a cascade of as many decades as may be desired is shown in FIGURE 12. Two valves V1 and V2 act as gates and amplifiers. A signal arriving at C0 is differentiated by the capacitor C5 and resistor R5 and the resulting pulse is applied to a grid of the valve V1. Similarly a signal arriving at A0 is differentiated by the capacitor C6 and the resistor R6 and the resulting pulse is applied to a grid of the valve V2. If there is no signal in line B0 which is connected to a further grid of each vlave, the valves are cut off but if there is a signal in B0 the gates are opened and accordingly if a signal arrives at C0 the differentiated pulse appears amplified in the anode circuit of V1 while if a signal appears at A0 the differentiated pulse appears amplified in the anode circuit of valve V2. By means of the condensers C7, C8 and resistors R7, R8 two signals from the anode of the corresponding valve at a short time interval apart are applied to the guides $a$, $b$ of the dekatron tube DT in the appropriate order to step the glow forward or backward. Thus if the measurement signal pulse changes from zone A to zone C the trigger circuit constituted by the transistors J9, J10 and J11 will change from J9 off to J11 off. As J11 goes off J9 becomes conducting and a pulse will appear at C0 and as there is a signal B0 present the whole time there will be a pulse from the valve V1 and the dekatron will be stepped on since the change from J11 to J9 represents an "add" pulse. In a similar way a change from zone C to zone A will generate a subtract pulse through the valve V2. If however there is a change from zone A to zone B the trigger circuit will change from J9 off to J10 off. There will be a signal at A0 which will be differentiated as before but as there is now no signal at B0 no "add" pulse will be produced because the gate V1 is now closed.

Since a dekatron tube can count only up to ten a cascade circuit must be provided to deal with larger numbers.

The problem is to transfer from one decade to the next only when the count changes from 9 to 0 or from 0 to 9. Another three stable-state trigger circuit is provided for this purpose constituted by three further transistors J12, J13 and J14 arranged so that if any one input is present the corresponding output is absent while with no input present the trigger remains in the condition set up by the last input. The transistor J12 is connected to the dekatron cathode 0 the transistor J13 to the dekatron cathodes 1 and 8 in parallel and the transistor J14 is connected to the dekatron cathode 9. The outputs of the transistors, marked CN, BN, AN, are connected to the next decade where they constitute the inputs corresponding with A0, B0, C0 in FIGURE 12. If for example, the dekatron glow rests on cathode 9 output signals will be present only at AN and BN. A direct change from 9 to 0 will transfer the output of the trigger from AN to CN while BN remains unchanged. The signal appearing at CN is "differentiated" in the next decade and, since with BN present the gates are open, a "carry" is generated. A signal will also appear at CN for a change from 9 to 8 but the simultaneous removal of the signal from BN closes the gates in the next decade to this pulse. A "borrow" is produced, in a similar manner, by a change from 0 to 9. Each "carry" signal so produced steps the next decade on one and each "borrow" signal steps it back one.

It will be understood that the first decade receives its signal not from a preceding stage but from the circuit of FIGURE 11.

So far the counting circuits described count in complete cycles. If as is usual it is desired to measure between whole numbers of cycles, as above mentioned this can be done by an analogue phase measurement if there is no interpolation grating or it can be effected digitally if there is an interpolation grating.

Considering first an analogue phase measurement, a circuit as shown in FIGURE 13 may be used. This circuit includes two coincidence gates each consisting of two transistors in parallel. The one, consisting of transistors J15 and J16, is opened by the appearance at 65a (from line 65 of FIG. 11) of the trailing edge of the A zone signal which corresponds to the leading edge of the backlash signal D (in other words the phase zero or transition point between the zones A and D) provided a signal is present at C0a from the line C0 of FIGURE 11. The other, consisting of transistors J17 and J18, is opened by the appearance of the trailing edge of the backlash signal (in other words the other end of the backlash signal representing the other phase zero or transistion point between zones D and C) at 66a (from line 66 of FIGURE 11) provided a signal present at A0a (from A0 FIGURE 11). Any of these pulses (add and subtract pulses representing a change of 360° to 0° and from 0° to 360° respectively), triggers a bistable circuit comprising two transistors J19 and J20, this circuit being reset by a measurement pulse derived from the signal $F_M$ which is supplied at the terminal 72a for instance from the collector terminal 72b of FIGURE 11. Owing to their direction both sets of pulses can be applied to the base of the same transistor J19. A current measuring instrument CM is included in the collector lead of the transistor J20 and as by virtue of its relatively long periodic time it serves to integrate over the period between switching on by an add or subtract pulse and switching off by a measurement pulse, its indication will depend on the relative phase of the switching on signal and the switching off signal. The instrument can therefore be calibrated in terms of phase difference between the two signals. While the count of complete cycles may be positive or negative, the phase indication is always in the same direction.

If an interpolation grating is provided as described above with reference to FIGURE 7 a digital interpolation of the interval between successive measurement pulses can be obtained. One circuit by which this can be done is shown in FIGURE 14. Here the reference signal FR is supplied to one grid of a valve V3 the anode of which is coupled through appropriate elements to the $a$ and $b$ guides of a dekatron tube DT2. The cathodes of this dekatron tube are individually connected to indicators conveniently in the form of small electronic tubes TI such as are used as miniature tuning indicators in radio receivers. The grids of these tuning indicators are also connected to a common bias line to which is supplied a pulse from a blocking oscillator constituted by a transistor J21 and a transformer T2. The pulse so supplied is set to $\frac{1}{10}$ of the period of the reference frequency FR. The measurement signal $F_M$ after squaring and differentiation to produce a pulse, is applied to a blocking oscillator consisting of a transistor J22 and transformer T3 and pulses similarly derived from the interpolation signal $F_I$ are applied to another blocking oscillator constituted by the transistor J23 and transformer T4. These blocking oscillators generate rectangular pulses of $\frac{1}{20}$ of the reference period. These pulses are fed to a coincidence gate constituted by two further transistors J24, J25 which triggers the blocking oscillator J21, T2, so that that tuning indicator TI will be illuminated which simultaneously receives a pulse from the oscillator J21, T2 and a signal from one of the cathodes of the dekatron tube DT2. This will occur only when the gate J24, J25 receives simultaneously pulses from the oscillators J22, T3 and J23, T4 that is when the measurement and interpolation signals are in phase which occurs once in 10 cycles of the reference signals as in FIGURE 8. It will be understood that this circuit can be combined with that shown in FIGURE 12 so that bi-directional counting of complete cycles is obtined while tubes T1 give a digital indication of the phase between complete counts. It will also be understood that a digital interpolation of only 10 is given purely as an example. A counting tube for any desired fraction can be constructed and the other frequencies varied as necessary to interpolate with any desired degree of fineness. Alternatively a cascade arrangement can be used in which for example the first tube and indicators show $\frac{1}{100}$ of a fringe and the second $\frac{1}{10}$ of a fringe.

In order that the indicated phase in the circuit of FIGURE 14 can be set to zero at a given datum when a "set zero" signal pulse is applied, a bistable circuit is operated by the set zero pulse and its output inhibits a gate in the input line to the counter i.e. in the lead to the grid of valve V3 and at the same time the bistable circuit sets the counter to "0." When the phase of the sample pulse from the coincidence gate J24, J25 reaches zero, the zero gate on the counter opens (i.e. the zero line from the dekatron tube DT2), a signal also goes to the bistable circuit and resets it. The input gate is thus opened and the counter resumes counting. The counter is now in step and continues to indicate zero at that position of the measurement grating.

It should be noted that the rate at which the digital interpolation occurs with the circuit of FIGURE 14 (unlike the analogue scheme of FIGURE 13) is slower than the fringe rate by the interpolation factor e.g. in the case of the $\frac{1}{10}$ fringe scheme 10 fringes are needed for each pulse from the coincidence gate J24, J25. The information about phase is therefore obtained at $\frac{1}{10}$ the rate of the analogue scheme but the counting rate for fringes is unchanged. This is not necessarily a disadvantage since normally the gratings are moving slowly when the interpolation information is required.

Thus coarse gratings may be used to permit high traverse speeds for a given maximum counting rate, since reversible dekatron counters as in FIGURE 12 are limited in speed but a high interpolation accuracy can still be had by using high speed single direction counters as in FIGURE 14 for phase measurement.

Another possibility is to use the digital interpolation technique and effect the counting of complete cycles from the phase indicators TI. Taking for example the case of interpolation of 1 in 10, the cathodes of a single direction dekatron are connected to gates and indicators as described above with reference to FIGURE 14. If now the outputs from the 0, 9, and 1-8 gates of the dekatron are connected to a three state trigger this may be the input stage of the reversible dekatron counter already described with reference to FIGURE 12. This results in simpler circuit arrangements.

It will be understood by those skilled in the art that the circuits above described can be modified for example by the substitution of transistors for valves or valves for transistors according to circumstances and convenience. Further since these elements are used as switching elements it would accordingly even be possible in some cases to substitute relays or similar mechanical switching devices. It should also be pointed out that since the circuits operate by switching operations initiated by pulses for which purpose the various signals are differentiated after squaring if necessary, the original wave form of the signals is relatively unimportant provided it is such as can conveniently be squared if necessary.

Finally these counting circuits are useful in other applications where similar problems arise.

It will be clear that the term optical gratings used herein is to be understood in a broad sense as meaning any device by the relative movement of two of which a beam of light can be modulated in regular fashion, e.g. toothed wheels and that in some cases one grating may be a reflection grating.

We claim:

1. Apparatus for measuring the displacement of a moving part along a pre-determined path comprising a measurement member moving with the moving part, a comparison member in constant movement juxtaposed to the measurement member, at least one of said members carrying a fluctuating pattern, the fluctuations of which are distributed at constant pitch in the direction of movement of the moving member, means responding to the fluctuating pattern for deriving an alternating current measurement signal from the relative movement of the measurement member and comparison member, means for deriving an alternating current reference signal having a determined constant relationship to the movement of the comparison member, a two-way impulse operated counter, means for splitting one of said signals into three substantially equal zones and a short backlash zone, means for deriving a sampling pulse per cycle in constant phase relationship from the other signal, and means controlled by the order of appearance of the sampling pulses in relation to the zones for supplying impulses at corresponding times and in the appropriate direction to a counter thereby to cause it to count the difference in magnitude and sign of the total number of cycles of difference between the reference and measurement and signals from a datum.

2. Apparatus as set forth in claim 1 in which the means for splitting the one signal into zones comprises circuits for squaring and differentiating the other signal, a bistable circuit triggered by the pulses from said differentiating circuit thereby to produce one sequence of zones, a mono-stable circuit triggered by the output of said bistable circuit thereby to produce the next sequence of zones, a second mono-stable circuit triggered by the recovery of said mono-stable circuit to produce the backlash zones and a third mono-stable circuit triggered by the recovery of said second mono-stable circuit to produce the remaining sequence of zones, said third mono-stable circuit on recovery resetting the bi-stable circuit.

3. Apparatus as set forth in claim 1 in which the counting means includes a squaring and differentiating circuit to which the measurement signal is supplied, a blocking oscillator circuit triggered by the pulses from said squaring and differentiating circuit, three co-incidence gates supplied by said blocking oscillator circuit and to which the zone signals are also supplied, a three-stable-state trigger circuit supplied with the output from the three gates, and a dekatron counting circuit to which the output of the three-stable-state trigger circuit is supplied.

4. Apparatus as set forth in claim 3 also including two coincidence gates opened respectively by the zone boundaries corresponding to the two phase zeros and to which the counting pulses are applied, a bi-stable circuit triggered by the outputs of the two coincidence gates and reset by said sampling pulses, and a measuring instrument supplied by said bi-stable circuit and interpolating over the intervals between triggering and resetting, thereby indicating in analogue form the phase difference beyond the integral number of cycles of difference between the measurement and reference signals.

5. Apparatus for measuring the displacement of a moving part comprising a measurement member moving with the moving part, a comparison member in constant movement juxtaposed to the measurement member, at least one of said members carrying a fluctuating pattern the fluctuations of which are distributed at constant pitch in the direction of movement of the moving member, means responding to the fluctuating pattern for deriving an alternating current measurement signal from the relative movement of the measurement member and comparison member, means for deriving an alternating current reference signal having a determined constant relationship to the movement of the comparison member, means for deriving an alternating current interpolation signal having a determined constant relationship to the movement of the comparison member differing a little from the reference frequency, means for continuously counting integral cycles of difference in the total number of cycles from a datum of the measurement and reference signals, and means for interpolating digitally between the said integral cycles of difference, said interpolating means including a counter to which the reference, interpolation and measurement signals are applied and which is only effective when the phases of the interpolation and measurement signals coincide.

6. Apparatus as set forth in claim 5 including a dekatron tube stepped on by the reference signal, indicators individually connected to the cathodes of the dekatron tube, and a coincidence gate to which the measurement signal and interpolation signal are applied and the output of which controls the operation of the indicators so that only that indicator functions which receives simultaneously a signal from the dekatron tube and a pulse from the co-incidence gate.

7. Apparatus for measuring the displacement of a moving part comprising a measurement member moving with the moving part, a comparison member in constant movement juxtaposed to the measurement member, at least one of said members carrying a fluctuating pattern, the fluctuations of which are distributed at a constant pitch in the direction of movement of the moving member, means responding to the fluctuating pattern for deriving an alternating current measurement signal from the relative movements of the measurement member and comparison member, means for deriving an alternating current reference signal having a determined constant relationship to the movement of the comparison member, means for deriving an alternating current interpolation signal having a determined constant relationship to the movement of the comparison member differing a little from the frequency of the reference signal, means for continuously counting integral cycles of difference in the total number of cycles from a datum of the measurement and reference signals, and means for interpolating digitally between the said integral cycles of difference, said interpolating means including a dekatron tube stepped on by the reference signal, indicators individually connected to the cathodes of the dekatron tube, a coincidence gate to which the measurement signal and interpolation signal are applied and the output of which controls the operation of the indicators so that only that indicator functions which receives simultaneously a signal from the dekatron tube and a pulse from the coincidence gate, a bi-stable circuit operable by a "set zero" pulse, and a gate in the input line by which the reference signal is supplied, the output of the bi-stable circuit inhibiting and at the same time setting the counter to zero, the counter commencing to operate when the pulse from the coincidence gate reaches zero and at the same time resetting the bi-stable circuit.

8. Apparatus for measuring the displacement of a moving part along a predetermined path comprising a measurement member moving with the moving part, a comparion member in constant movement juxtaposed to the measurement member, at least one of said members carrying a fluctuating pattern, the fluctuations of which are distributed at constant pitch in the direction of movement of the moving member, means responding to the fluctuating pattern for deriving an alternating current measurement signal from the relative movement of the measurement member and comparison member, means for deriving an alternating current reference signal having a determined constant relationship to the movement of the comparison member, a two-way impulse operated counter, means for splitting one of said signals into three zones, means for deriving a sampling pulse per cycle in constant phase relationship from the other signal, and means controlled by the order of appearance of the sampling pulses in relation to the zones for supplying impulses at corresponding times and in the appropriate direction to said counter to cause it to count the said difference.

9. A method of measuring the displacement along a predetermined path of a moving part from a datum position which comprises the steps of deriving from the displacement along the path of the moving part a measurement A.C. signal having a frequency compounded from a frequency of predetermined value and a frequency the value and sign of which are directly related respectively to the speed and sense of displacement along the path of the moving part, generating a reference A.C. signal of frequency exactly equal to the said frequency of predetermined value and ascertaining to the nearest integral number of cycles the total phase relationship of the measurement signal and reference signal starting from an instant when the moving part is at a predetermined position on the path in relation to the datum position, generating a continuous interpolation A.C. signal of predetermined frequency precisely related to but differing from that of the reference signal, and counting the cycles of the reference signal and noting the count at the instant the phase of the interpolation signal and the measurement signal coincide, the value of the count so noted constituting a digital interpolation between the integral number of cycles ascertained from the total phase relationship to the measurement and reference signal.

10. A method of measuring the displacement along a predetermined path of a moving part from a datum position which comprises the steps of:
   (A) deriving from the displacement along the path of the moving part a measurement A.C. signal compounded from a frequency of predetermined value and a frequency the value and sign of which are directly related respectively to the speed and sense of displacement along the path of the moving part;
   (B) generating a reference A.C. signal of frequency exactly equal to the said frequency of predetermined value; and
   (C) ascertaining at least to the nearest integral number of cycles the total phase relationship of the measurement signal and reference signal starting from an instant when the moving part is at a predetermined position on the path in relation to the datum position, the total phase relationship being ascertained through a continuous comparing of the two signals and counting only the difference in the total number of cycles from the said instant, the comparing and counting including:
      (a) splitting one of the signals into at least three zones,
      (b) deriving a sampling pulse once per cycle from the other signal, and
      (c) noting the appearance of the sampling pulses in the zones.

11. A method of measuring the displacement along a predetermined path of a moving part from a datum position which comprises the steps of:
   (A) deriving from the displacement along the path of the moving part a measurement A.C. signal compounded from a frequency of predetermined value and a frequency the value and sign of which are directly related respectively to the speed and sense of displacement along the path of the moving part;
   (B) generating a reference A.C. signal of frequency exactly equal to the said frequency of predetermined value; and
   (C) ascertaining at least to the nearest integral number of cycles the total phase relationship of the measurement signal and reference signal starting from an instant when the moving part is at a predetermined position on the path in relation to the datum position, the total phase relationship being ascertained through a continuous comparing of the two signals and counting only the difference in the total number of cycles from the said instant, the comparing and counting including:

(a) splitting one of the signals into four zones,
(b) deriving a sampling pulse once per cycle from the other signal, and
(c) noting the order of appearance of the sampling pulse in the zones other than the fourth zone, the fourth zone separating the point at which a plus value is counted from the point at which a minus value is counted and having an amplitude just greater than the amplitude of any external vibration which might effect the counting.

12. In a device for measuring the displacement of a moving part along a predetermined path and including means for deriving an alternating current measurement signal related to the movement of the part, and an alternating current reference signal having a predetermined value; the improvement of apparatus for continuously counting the difference in magnitude and sign between the total number of cycles from a datum of the two alternating current signals comprising a two-way impulse operated counter, means for splitting one of said signals into at least three zones, two of which occupy respectively periods marking the beginnings and ends of the cycles of said signal, means for deriving a sampling pulse per cycle in constant phase relationship from the other signal, and means controlled by the order of the appearance of the sampling pulse in relation to the zones for applying an impulse to said counter upon the appearance of the second of two successive sampling pulses in a different one of the two said zones marking the beginning and end of two different cycles of said signal from that in which the proceeding pulse appeared, the impulse being positive for one order of appearance and negative for the other.

13. The improvement according to claim 12 in which said zones further include a narrow backlash zone between said two zones marking the beginning and end of the cycles of said one signal.

14. In a method for measuring the displacement of a moving part along a predetermined path from a datum position and including steps of deriving a measurement alternating current signal related to the movement of the part and a reference alternating current signal of predetermined value, the improvement of continuously comparing the two alternating current signals and counting in magnitude and sign the difference between the total number of cycles of the two signals from the datum, said improvement including the steps of splitting one of the signals into at least three zones, deriving a sampling pulse once per cycle from the other signal, noting the appearance of the sampling pulses in the zones and effecting a count of plus one at a transition in one direction from one particular zone to another particular zone and effecting a count of minus one upon transition in the opposite direction between the two particular zones.

15. In a method for measuring the displacement of a moving part along a predetermined path from a predetermined starting point and including the steps of deriving a measurement alternating current signal related to the movement of the part and a reference alternating current signal of predetermined value, the improvement of continuously comparing the two signals and counting in magnitude and sign of the difference between the total number of cycles of the two signals from the predetermined starting point, said improvement including the steps of splitting one of the signals into four zones, deriving a sampling pulse once per cycle from the other cycle, and noting the order of appearance of the sampling pulse in the zones other than the fourth zone, the fourth zone separating the point at which a plus value is counted from the point at which a minus value is counted and having an amplitude just greater than the amplitude of any external vibration which might effect the counting.

References Cited in the file of this patent

UNITED STATES PATENTS

| | | |
|---|---|---|
| 2,557,219 | Flint et al. | June 19, 1951 |
| 2,628,539 | Neergaard | Feb. 17, 1953 |
| 2,685,082 | Bemon et al. | July 27, 1954 |
| 2,832,259 | Merton | Apr. 29, 1958 |
| 2,882,475 | Neergaard | Apr. 14, 1959 |
| 2,886,717 | Williamson et al. | May 17, 1959 |
| 2,948,890 | Barth et al. | Aug. 9, 1960 |
| 2,965,762 | Turck | Dec. 28, 1960 |
| 2,993,279 | Bower | July 25, 1961 |
| 3,001,081 | Bower | Sept. 19, 1961 |
| 3,076,374 | Neergaard | Feb. 5, 1963 |

FOREIGN PATENTS

| | | |
|---|---|---|
| 773,494 | Great Britain | Apr. 24, 1957 |
| 791,902 | Great Britain | Mar. 12, 1958 |

OTHER REFERENCES

Automatic Measurement of Small Deviations in Periodic Structures, Closson, The Review of Scientific Instruments, vol. 29, No. 10, October 1958.